United States Patent [19]
Yamamoto et al.

[11] Patent Number: 5,293,226
[45] Date of Patent: Mar. 8, 1994

[54] THREE TUBE COLOR TELEVISION PROJECTION DISPLAY DEVICE

[75] Inventors: Hideki Yamamoto; Takayuki Yoshioka, both of Tokyo, Japan

[73] Assignee: Pioneer Electronic Corporation, Tokyo, Japan

[21] Appl. No.: 811,120

[22] Filed: Dec. 20, 1991

[30] Foreign Application Priority Data

Dec. 26, 1990 [JP] Japan .................. 2-414057

[51] Int. Cl.⁵ .................. H04N 5/74; H04N 9/31
[52] U.S. Cl. .................. 348/780; 348/745
[58] Field of Search .................. 358/60, 64, 231, 237; H04N 5/74, 9/31

[56] References Cited

U.S. PATENT DOCUMENTS

| | | | |
|---|---|---|---|
| 4,087,835 | 5/1978 | Nishimura | 358/60 |
| 4,352,124 | 9/1982 | Kline | 358/60 |
| 4,376,949 | 3/1983 | Rowe | 358/60 |
| 4,609,945 | 9/1986 | Oguino | 358/64 |
| 4,651,217 | 3/1987 | Yamazaki | 358/64 |
| 5,010,397 | 4/1991 | Hasegawa | 358/84 |
| 5,103,302 | 4/1992 | Yoshida | 358/60 |

*Primary Examiner*—Tommy P. Chin
*Assistant Examiner*—Richard Lee
*Attorney, Agent, or Firm*—Sughrue, Mion, Zinn, Macpeak & Seas

[57] ABSTRACT

A three tube type projection television display device comprising red, green and blue projection tubes, wherein optical axes of projection lenses for the inclined projection tubes are off centered, instead of preparing a number of optical couplers of different sizes, from that of the inclined projection tubes by an eccentricity of δ when a projection picture size is varied for correcting a trapezoidal distortion in the same way as in the Scheimpflug rule, providing good registration on the screen and also bringing the projected pictures into focus on the entire screen.

6 Claims, 4 Drawing Sheets

THREE TUBE COLOR TELEVISION PROJECTION DISPLAY DEVICE

BACKGROUND OF THE INVENTION

1. Field of the Invention

This invention relates to a projection display device and, more particularly, to a three-tube projection display device for projecting color television pictures on a screen with projection lenses by converging three primary color images displayed on three color projection cathode-ray tubes of red, green and blue.

2. Description of the Prior Art

An optical system for use with a prior-art projection television display device includes three color projection lenses, two of which are inclined relative to a screen (FIG. 1). In such prior-art projection television display device, a green projection tube 10G is normally placed at the center and a red projection tube 10R and blue projection tube 10B are placed at respective opposite sides thereof. Projection lenses 20R, 20G and 20B are then arranged in front of the red projection tube 10R, green projection tube 10G and blue projection tube 10B, respectively.

To compensate image distortions by the projection lenses, optical couplers 30R, 30G and 30B are interposed between the projection lenses 10R, 10G and 10B and the respective three color projection tubes 10R, 10G and 10B.

Three primary color images displayed on the three color projection tubes 10R, 10G and 10B are converged and focused on a screen 40 by means of the projection lenses 20R, 20G and 20B for reconstituting color television pictures thereon.

In projecting the three primary color images on the screen, there is no problem for the projection lens 20G since an optical axis $20G_s$ thereof is arranged normal to the screen 40; however, there are some problems for the optical lenses 20R and 20B since optical axes $20R_s$ and $20B_s$ of the projection lenses 20R and 20B at the right and left sides of the projection lens 20G are inclined relative to the screen 40.

Accordingly, in such a projection display device as described above, face plates $10R_a$ and $10B_a$ of the projection tubes 10R and 10B are inclined, in accordance with what is called the Scheimpflug rule, by an amount of $\beta$ relative to the respective lens surfaces of the projection lenses 20R and 20B to provide entirely focused pictures on the screen 40, even though the optical axes of the projection lenses are inclined thereto (FIG. 2).

The inclined angle of $\beta$ (hereinafter referred to as a "Scheimpflug angle") between the lens surface and the face plate of the projection lens has the following relation with the projection screen:

$$(1/m) \tan \theta = \tan \beta$$

where, m = magnification (optical power) of the projection lens 20

$\theta$ = the angle between the lens surface of the projection lens 20 and the screen 40

In FIG. 3, there is shown an optical coupler 30 coupled with the face plate of the projection tube 10. The optical coupler 30 is provided with a meniscus lens 30b, which is for compensating distortion of the projected image on the screen, mounted on a center-holed optical coupler frame 30a on the side thereof facing the projection lens 20 by employing a packing 30c, and then attached to the face plate 10a of the projection tube 10 on the side thereof facing the projection tube 10 by employing another packing 30d.

A space formed by the meniscus lens 30b, an inner wall of the optical coupler frame 30a and the face plate 10a of the projection tube 10 is filled with a liquid coolant for cooling the face plate 10a. The optical axis of the meniscus lens 30b is aligned with that of the projection lens 20.

Further, in FIG. 3, the angle between the meniscus lens 30b and the face plate 10a of the projection tube 10 is set to the Scheimpflug angle of $\beta$; however, it is possible to arrange the meniscus lens 30b in parallel with the face plate 10a of the projection tube 10 and incline, as shown in FIG. 4, the optical axis of the projection lens 20 by an angle of $\beta$ with respect to the optical axis of the projection tube 10 for providing the same effect as that of the configuration shown in FIG. 3. In FIGS. 3 and 4, element 20a designates a projection lens frame for mounting the projection lens 20 on the optical coupler frame 30a.

In the projection television display device of the type as described above, if the size (normally indicated by the diagonal length in inches) of the projection picture is changed, the angle $\theta$ between the optical axes of the projection lens at the center and each of the projection lenses at the right and left (or the angle $\theta$ between the projection lens surface and the screen) and the magnification m of each projection lens must be varied in accordance with the projection distance and, accordingly, the Scheimpflug angle $\beta$ will also be varied in accordance with the size of projection picture.

In accordance with the prior art projection television display device, therefore, there have been employed a number of dedicated optical coupler frames in order to provide different Scheimpflug angles $\beta$, between the surface on which the meniscus lens is mounted and the surface which the face plate abuts, in accordance with the picture size selected to be projected on the screen. However, since the optical coupler frame of this kind has normally been manufactured by aluminum die casting and the like, a number of molds have been prepared for different projection picture sizes, thus resulting in a problem of high production cost.

Further, it has been required to incline the projection tubes precisely in order to provide the registration of three primary color images on the screen. This in turn has caused problems such that tight toreance mounting parts are required to mount the projection tubes whenever the projection picture size is changed and, moreover, no manufacturing jigs can be used in common for producing such mounting parts.

It is therefore an object of this invention is to eliminate problems encountered by the prior art projection television display device and to provide a projection television display device wherein an optical coupler frame can be utilized for any picture size of projection television display by off-setting the centers of a meniscus lens and projection lens from that of a projection tube.

SUMMARY OF THE INVENTION

A three tube projection television display device in accordance with this invention comprises red, green and blue projection tubes, two of which are inclined inwardly, wherein optical axes of projection lenses for the inclined projection tubes are off centered with respect to the inclined projection tubes while being normal thereto to provide the registration of projected images on a screen.

In the three tube projection television display device of this invention, an amount $\delta$ of eccentricity between the optical axis of the projection tube and that of the projection lens is given by:

$$\delta = R \cdot \sin \beta$$

where, $$\tan \beta = (n/m) \tan \theta$$

R = curvature of plano-convex face plate (curved on the side of phosphor) of the projection tube
m = magnification of the projection lens
n = refractive index of the coolant
$\theta$ = angle of incidence to the screen Since the optical axes of the projection tube and projection lens are off centered by the eccentricity of $\delta$, there is obtained the same effect as that of the Scheimpflug angle $\beta$ which is given by inclining the optical axis of the projection lens with respect to the optical axis of the projection tube. Also, it is possible to correct trapezoidal distortion in the same way as in the Scheimpflug rule, and thus the projected images are brought into focus over the entire screen.

Accordingly, when the distance between the projection tubes and the screen is varied in order to change the picture size of the projection television display, it is not necessary to design and manufacture a new optical coupler, but it is only necessary to vary the eccentricity between the axes of the projection lens and projection tube by displacing the optical coupler to the left or right direction.

DESCRIPTION OF THE PREFERRED EMBODIMENT

Figure 5:
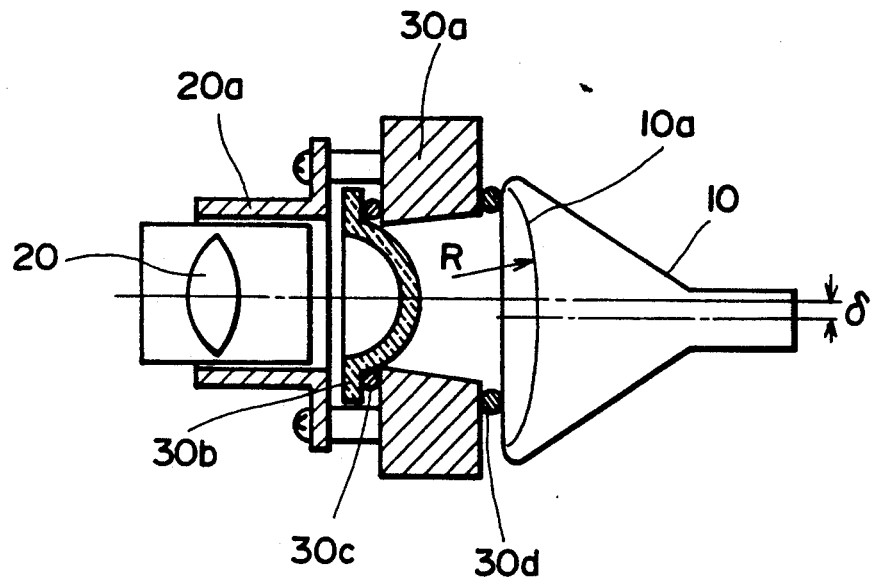
FIG. 5 is a cross-sectional view showing an embodiment of this invention.
Figure 6:
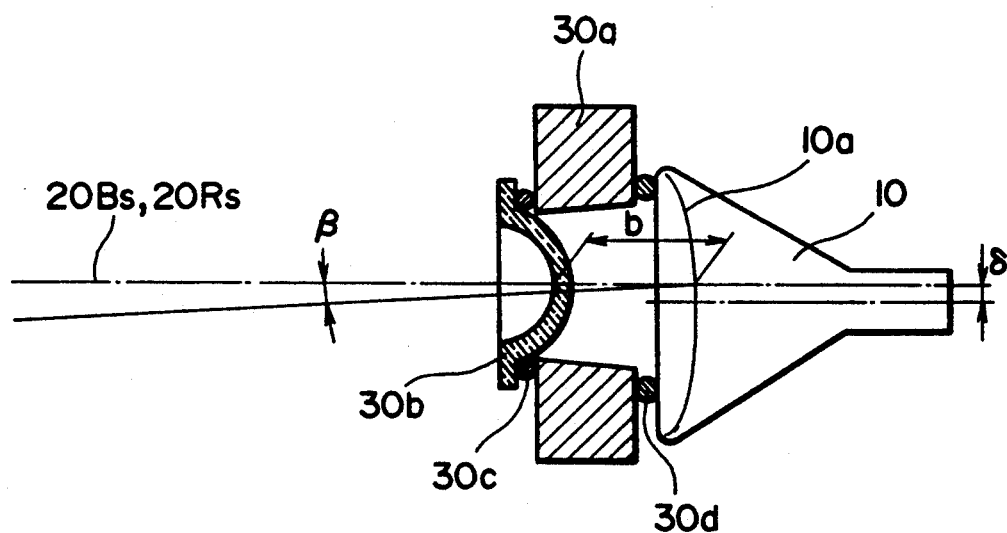
FIG. 6 is a cross sectional view illustrating an eccentricity of axes in the embodiment of FIG. 5.

A preferred embodiment of this invention will now be described by referring to FIGS. 5 and 6. In FIG. 5, reference numeral 10 designates either the red or blue projection tube, reference numeral 20 designates a projection lens, and reference numeral 30 designates an optical coupler. The optical coupler 30 consists of a coupler frame 30a, a meniscus lens 30b and packings 30c and 30d. The projection lens 20 is mounted on the coupler frame 30a by means of a projection lens frame 20a.

The optical axis of the optical coupler 30 is aligned with that of the projection lens 20, and the optical axis of the projection tube 19 is offset by an amount $\delta$ from the optical axis of the optical coupler in a direction, for example, towards the green image projection tube located at the center.

Figure 1:
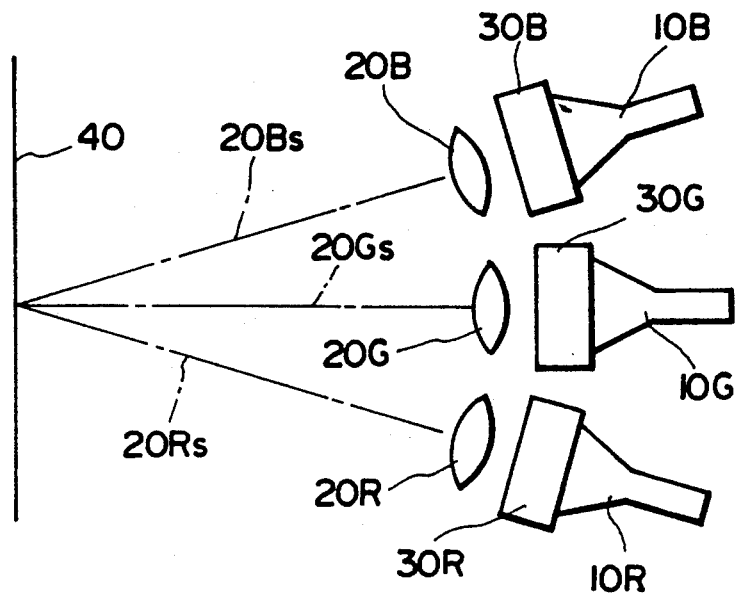
FIG. 1 is the diagram showing a structure of a conventional three tube projection television display device.
Figure 2:
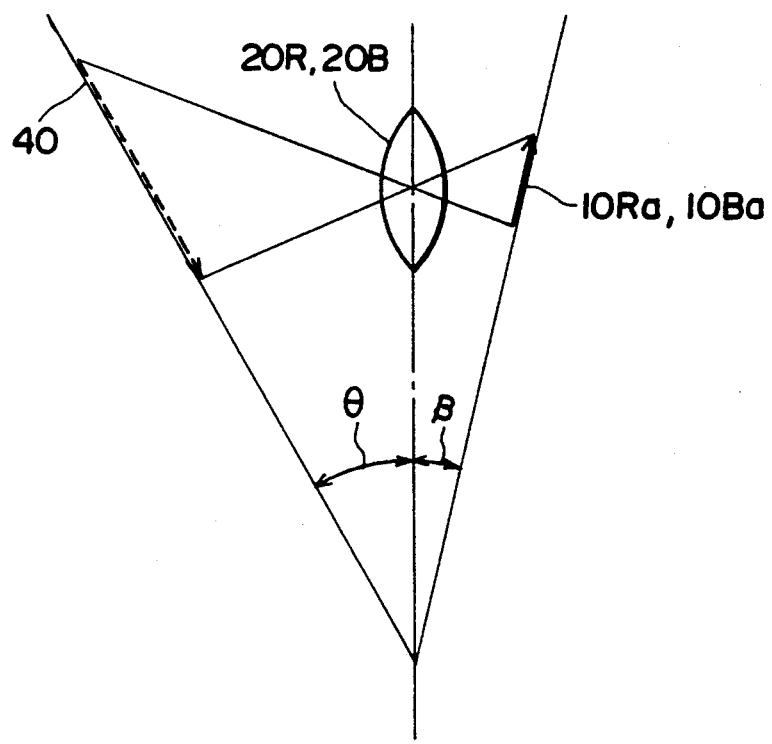
FIG. 2 is a diagram illustrating the prior art Scheimpflug rule, the principle of which has a relation with this invention.
Figure 3:
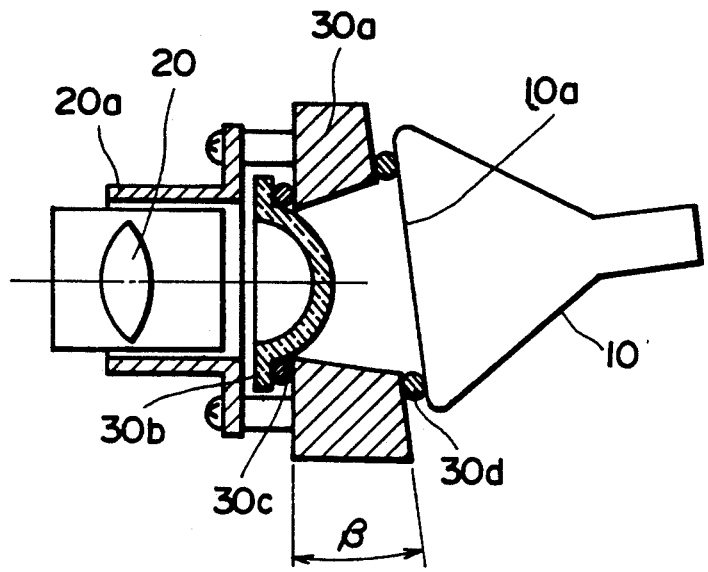
FIG. 3 is a cross-sectional view showing a conventional optical coupler for providing a Scheimpflug angle of $\beta$.
Figure 4:
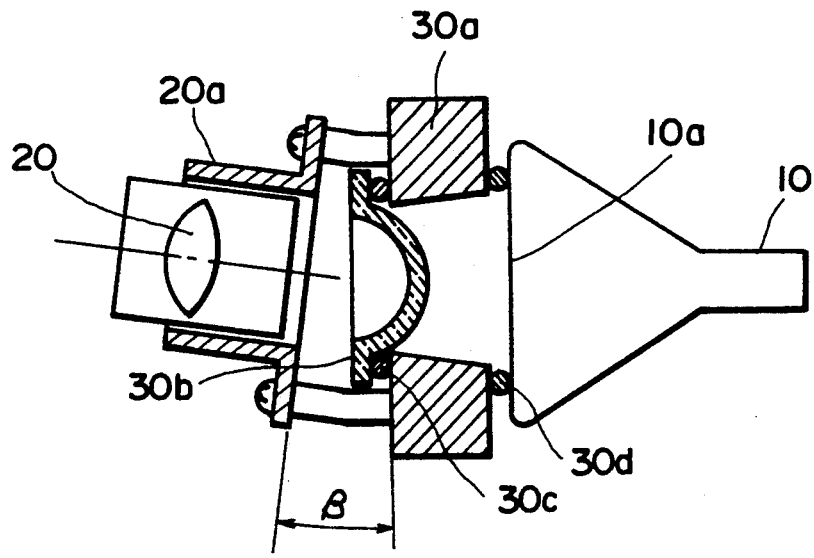
FIG. 4 is a cross-sectional view showing another type of conventional optical coupler for providing the Scheimpflug angle of $\beta$.

In the prior art television projection device, since the red and blue projection tubes 10R and 10B are inclined relative to the screen, if the axes of the projection tube 10, projection lens 20 and optical coupler 30 are aligned in line, red and blue images are projected on the screen not only in a keystone shape but out of focus except in the vicinity of the optical axes. Accordingly, in the prior art television projection device, the optical axis of the projection lens is inclined relative to the optical axis of the projection tube by an amount of $\beta$ given by:

$$\tan \beta = (n/m) \tan \theta$$

where,
m = magnification of the projection lens
n = refractive index of the coolant
$\theta$ = angle of incidence relative to the screen as shown in FIG. 2 in accordance with the Scheimpflug rule.

On the contrary, in accordance with a preferred embodiment of this invention, the eccentricity of $\delta$ is provided between the axes of the projection lens and projection tubes instead of satisfying the Scheimpflug angle of $\beta$ between the projection lens and projection tube, whereby $\delta$ is given by:

$$\delta = R \cdot \sin \beta$$

where,
R = curvature of plano-convex face plate of the projection tube 10

Accordingly, by offsetting the optical axis of the projection tube 10 from that of the projection lens 20 by the amount of $\delta$, there is obtained the same effect as attained by inclining the optical axes of the projection tube 10 and projection lens 20 relative to the screen in accordance with the Scheimpflug rule.

In this way, the trapezoidal distortion as well as defocusing around the central portion of the projected picture can be prevented.

In the above-described embodiment of this invention, when the magnification of the projection lens is m = 20, the refractive index of the coolant is n = 1.55 and the angle of incidence to the screen is $\theta = 3°$, the Scheimpflug angle $\beta$ will be given by:

$$\tan \beta = (n/m) \tan \theta$$

then,
$\beta = 0.233°$,
and, when the curvature of a plano-convex face plate 10a of the projection tube 10 is R = 350 mm, the eccentricity of $\delta$ will be given by:

$$\delta = R \cdot \sin \beta$$

thus, the eccentricity $\delta = 1.42$ mm.

In accordance with this invention, the distance b between the face plate of the projection tube 10 and the meniscus lens surface may differ from that of the projection television display device provided with the Scheimpflug angle $\beta$, it may require an appropriate means to keep this distance b as constant as possible by varying the thickness of the packings 30c and 30d.

As described above, in accordance with this invention, by offsetting the optical axes of the projection tube and projection lens from each other by the amount of $\delta$ given by the above equation, it is possible to obtain the same effect as attained by inclining the optical axis of the projection lens by the Scheimpflug angle of $\beta$. Consequently, in the present invention, the optical axes of the projection tube and projection lens are aligned in parallel, and this allows the projection lens to be mounted to the projection tube normal to the mounting surface thereof.

Further, in accordance with this invention, even if the distance between the projection lens and the screen is varied for projecting a required picture size, it is only required to displace the optical coupler frame, on which the projection lens and meniscus lens are mounted and in which the coolant is contained, relative to the projection tube for providing a required eccentricity between the axes of the projection lens and projection tube.

Still further, since it is only required in the projection television display device embodying the present invention to displace the projection tube from the projection lens, there is no need of preparing a number of optical coupler frames for a number of picture screen sizes. The displacement of the optical axes of the projection tube and projection lens can be performed simply by changing the mounting position of the optical frame. Accordingly, in accordance with this invention, not only can the optical frame of the green projection tube at the center be used commonly with that of the red or blue projection tube at the right or left side thereof, but an optical frame of a single size can also be used in common for a number of picture screen sizes.

Figure 7:
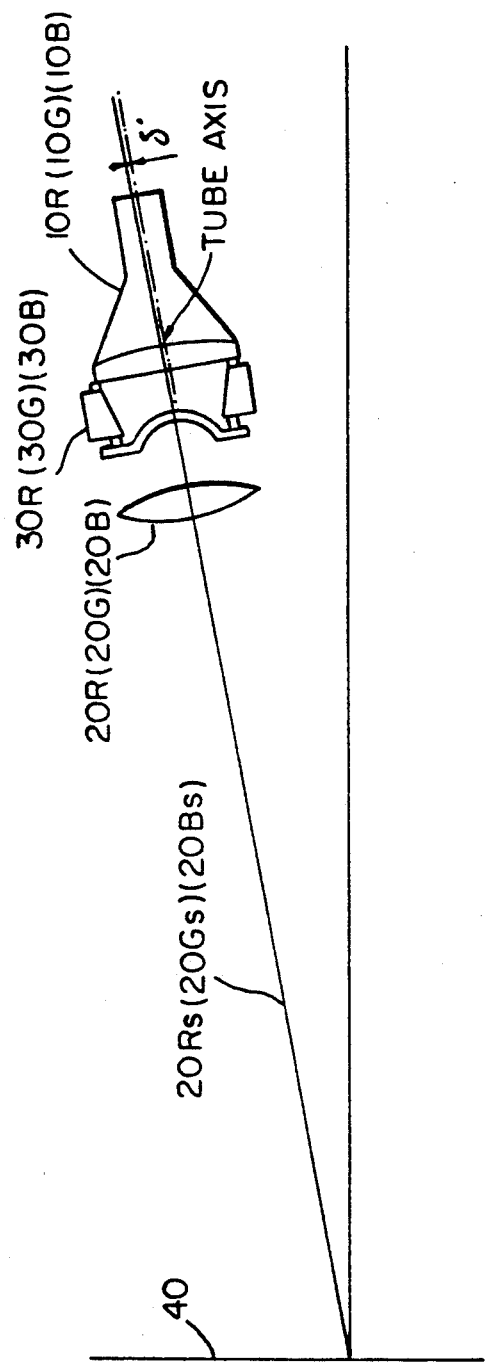
FIG. 7 is a side view of a projection television display device of an alternate embodiment of the invention.
Figure 8:
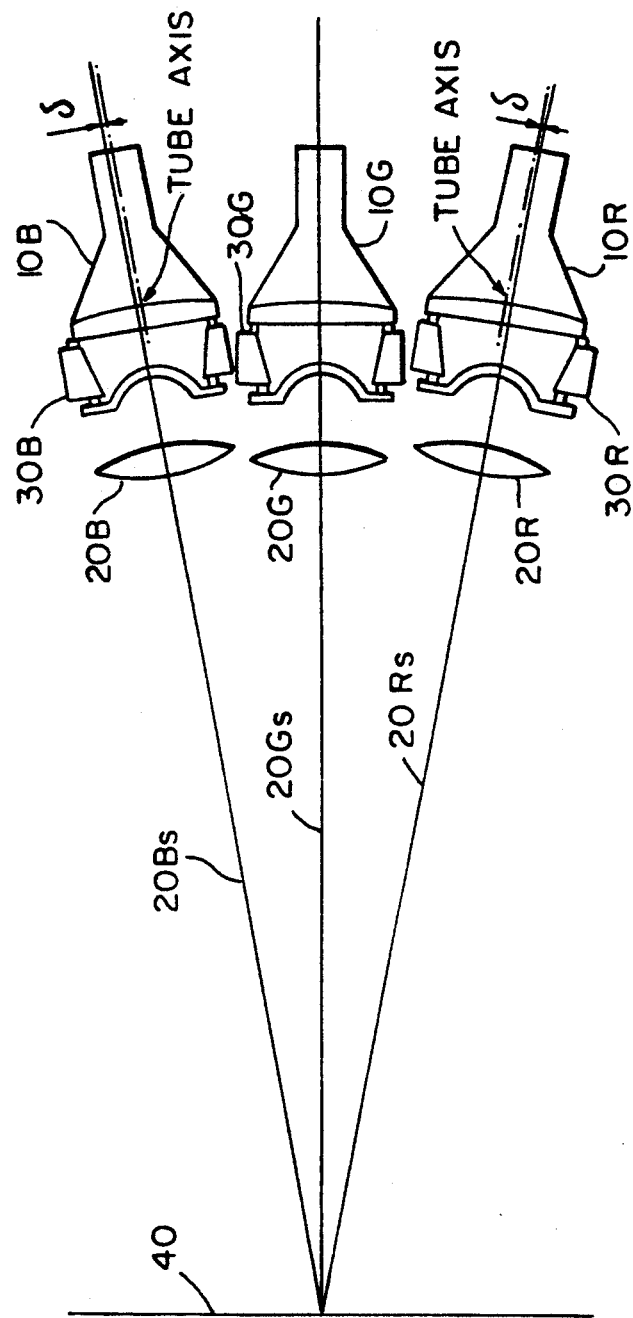
FIG. 8 is a plan view of the projection television display device of FIG. 7.

In the embodiment as described above, the green projection tube is arranged in normal to the screen. However, this invention is also effective for a green projection lens the optical axis of which is inclined relative the screen, this latter arrangement is shown in FIGS. 7 and 8 in the same way as in the red and blue projection lenses whose optical axes are inclined relative to the screen.

Consequently, the projection television display device embodying the present invention has many features that contribute to greater accuracy and reasonable productivity while attaining high performance in projecting television pictures and, moreover, to achievement of reducing overall production cost.

It is to be understood by those skilled in the art that the foregoing description relates only to the preferred embodiment of the present invention and that various changes and modifications may be made in the invention without departing from the scope thereof.

What is claimed is:

1. A three-tube projection television display device comprising:
    a projection screen;
    red, green and blue projection tubes, each of said projection tubes having a plano-convex faceplate, a projection tube optical axis of at least two of said projection tubes being inclined with respect to a line normal to a surface of said projection screen;
    first, second and third meniscus lenses for said red, green and blue projection tubes, respectively;
    first, second and third optical coupler frames for mounting said first, second and third meniscus lenses, respectively, to a faceplate of said red, green and blue projection tubes, respectively, said first, second and third optical coupler frames being identical to one another;
    a coolant filled in a space between said first, second and third meniscus lenses and the faceplates of said red, green and blue projection tubes, respectively;
    first, second and third projection lenses for said red, green and blue projection tubes, respectively, for projecting images displayed on said red, green and blue projection tubes onto said projection screen, each of said projection lenses having a projection lens optical axis parallel to the projection tube optical axis and to an electron gun axis of the respective one of said projection tubes, and said projection lens optical axis of each of said projection lenses for said at least two of said projection tubes inclined with respect to said line normal to said surface of said projection screen being offset from said projection tube optical axis and said electron gun axis of said respective one of said projection tubes by an amount which is substantially equal to a distance $\delta$ defined by the following equation:

$$\delta = R \cdot \sin \beta$$

where:

$$\tan \beta = (n/m) \tan \theta,$$

$\theta$ = angle between a lens surface of said projection lens and said screen,
R = curvature of said plano-convex faceplate of said respective one of said projection tubes,
m = magnification of said projection lens, and
n = refractive index of said coolant.

2. The three-tube projection television display device of claim 1, wherein a projection tube optical axis of said green projection tube is normal to said surface of said screen, and projection tube optical axes of said red and blue projection tubes are inclined with respect to said line normal to said surface of said projection screen.

3. The three-tube projection television display device of claim 1, wherein projection tube optical axes of all of said red, green and blue projection tubes are inclined with respect to said line normal to said surface of said projection screen.

4. A three-tube projection television display device comprising:
    a projection screen;
    red, green and blue projection tubes, each of said projection tubes having a plano-convex faceplate, a projection tube optical axis of at least two of said projection tubes being inclined with respect to a line normal to a surface of said projection screen;
    first, second and third meniscus lenses for said red, green and blue projection tubes, respectively;
    first, second and third optical coupler frames for mounting said first, second and third meniscus lenses, respectively, to a faceplate of said red, green and blue projection tubes, respectively, said first, second and third optical coupler frames being identical to one another;
    a coolant filled in a space between said first, second and third meniscus lenses and the faceplates of said red, green and blue projection tubes, respectively;
    first, second and third projection lenses for said red, green and blue projection tubes, respectively, for projecting images displayed on said red, green and blue projection tubes onto said projection screen, each of said projection lenses having a projection lens optical axis parallel to the projection tube optical axis and to an electron gun axis of the respective one of said projection tubes, and the projection lens optical axis of respective ones of said projection lenses for said projection tubes inclined with respect to said line normal to said surface of said projection screen being offset from said projection tube optical axis and said electron gun axis of said respective ones of said projection tubes by an amount which is substantially equal to a distance $\delta$ defined by the following equation:

$$\delta = R \cdot \sin \beta$$

where:

$$\tan \beta = (n/m) \tan \theta,$$

$\theta$ = angle between a lens surface of said projection lens and said screen, R = curvature of said plano-convex faceplate of said respective one of said projection tubes, m = magnification of said projection lens, and n = refractive index of said coolant.

5. The three-tube projection television display device of claim 4, wherein a projection tube optical axis of said green projection tube is normal to said surface of said screen, and projection tube optical axes of said red and blue projection tubes are inclined with respect to said line normal to said surface of said projection screen.

6. The three-tube projection television display device of claim 4, wherein projection tube optical axes of all of said red, green and blue projection tubes are inclined with respect to said line normal to said surface of said projection screen.

* * * * *